June 10, 1958 W. P. FRANKENSTEIN 2,837,982
METHOD AND DEVICE FOR ERECTING CARTONS
Original Filed April 27, 1949 5 Sheets-Sheet 1
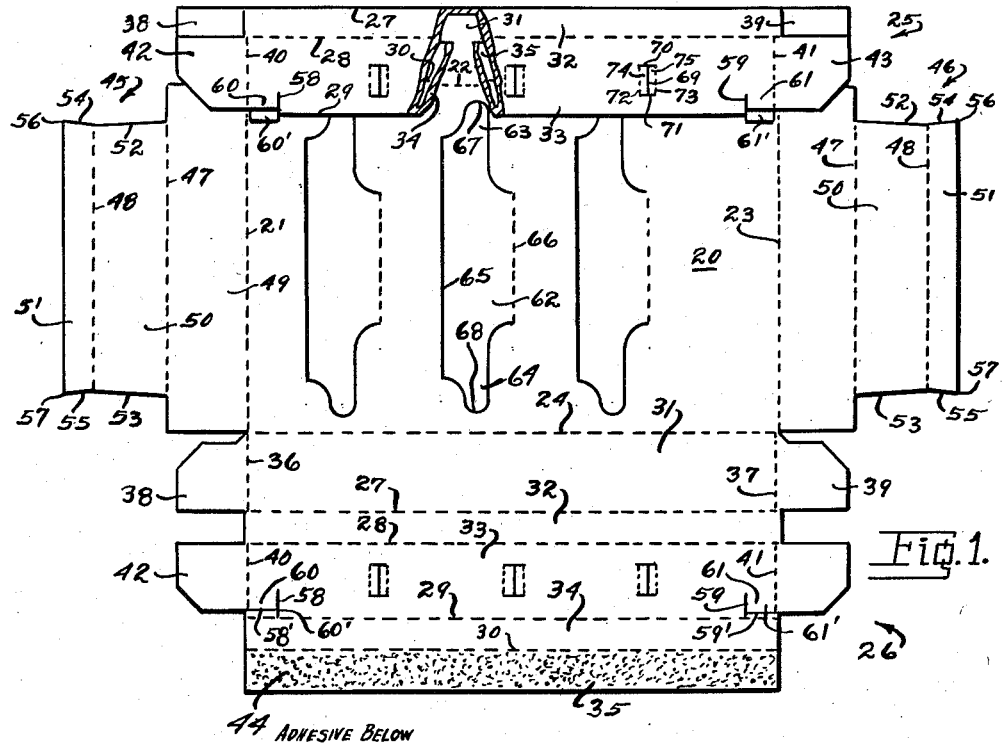
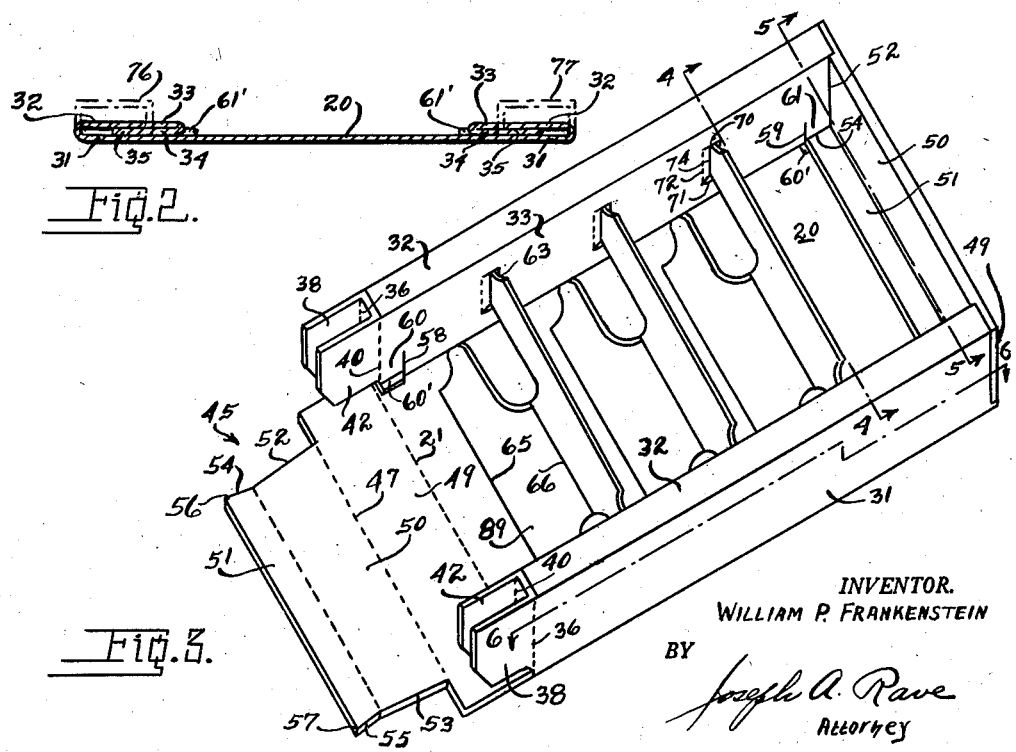
INVENTOR.
WILLIAM P. FRANKENSTEIN
BY
Joseph A. Rave
Attorney June 10, 1958     W. P. FRANKENSTEIN     2,837,982
METHOD AND DEVICE FOR ERECTING CARTONS
Original Filed April 27, 1949     5 Sheets-Sheet 2

INVENTOR.
WILLIAM P. FRANKENSTEIN
BY
Joseph A. Rave
Attorney

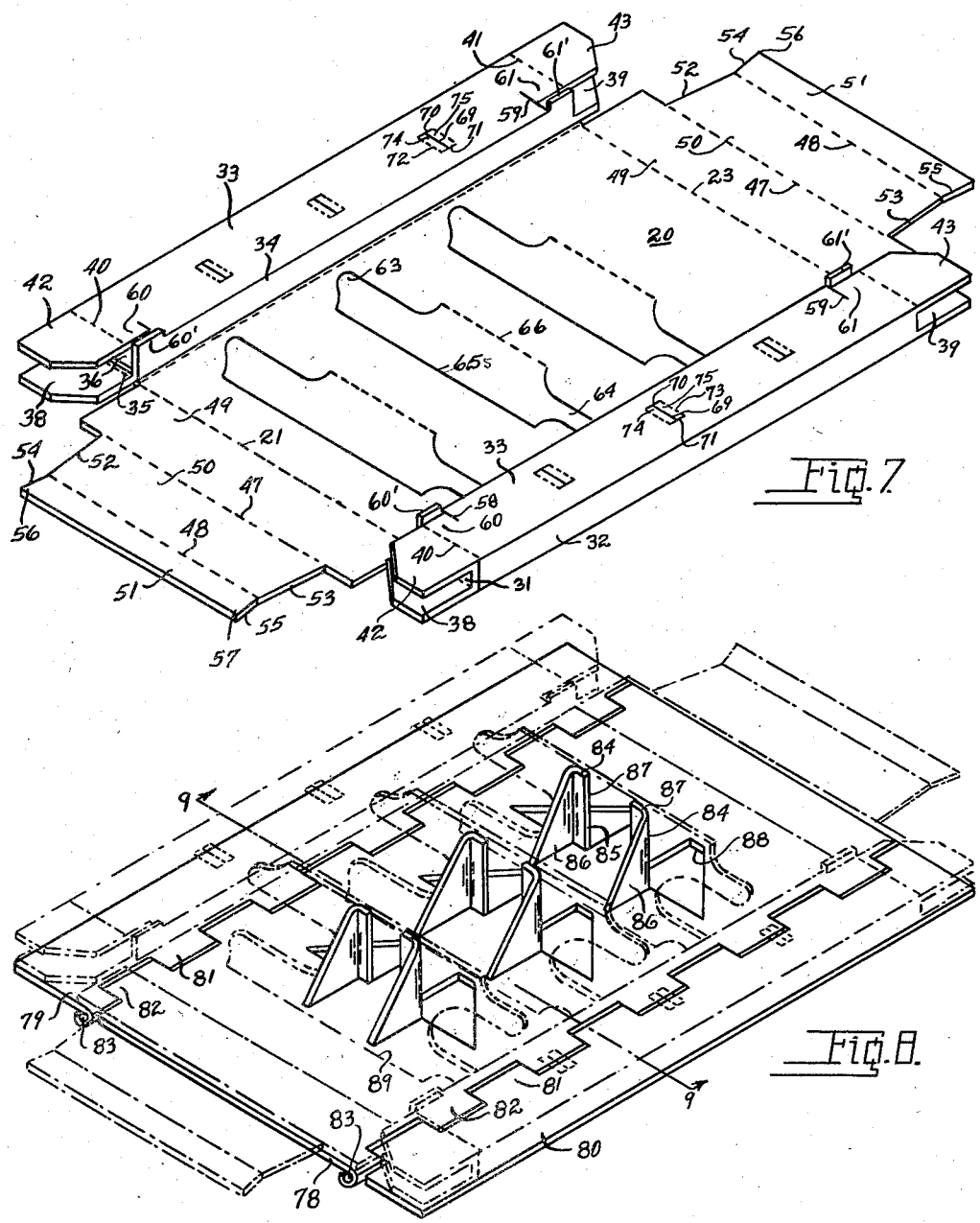

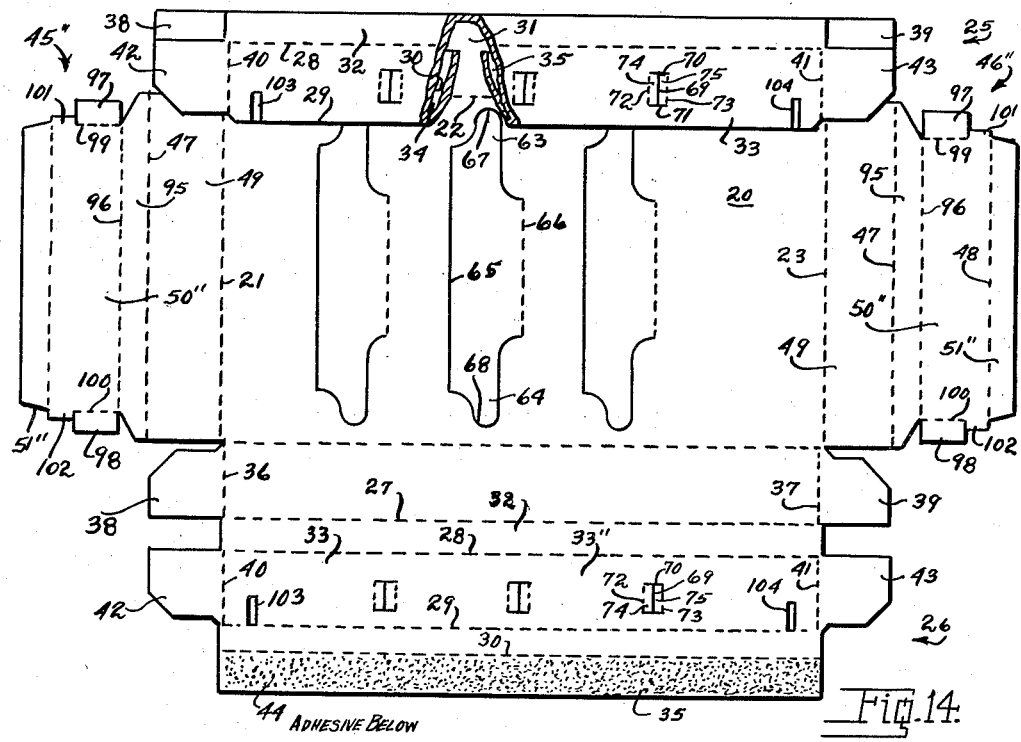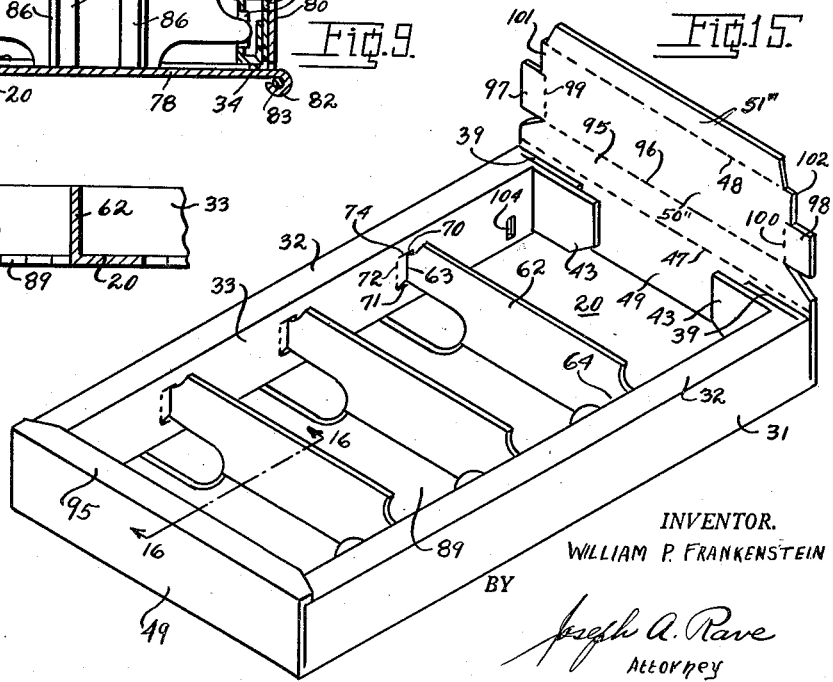

INVENTOR.
WILLIAM P. FRANKENSTEIN
BY
Joseph A. Rave
Attorney

United States Patent Office 2,837,982
Patented June 10, 1958

2,837,982
METHOD AND DEVICE FOR ERECTING CARTONS
William P. Frankenstein, Cincinnati, Ohio Original application April 27, 1949, Serial No. 89,891, now Patent No. 2,688,432, dated September 7, 1954. Divided and this application November 12, 1953, Serial No. 391,461

9 Claims. (Cl. 93—37)

This invention relates to improvements in a carton erecting device and the method of erecting the carton and particularly to such a device and method for erecting a transversely partitioned carton.

This invention is directed to transversely partitioned cartons or boxes which are formed from a single blank and shipped to the user in a knocked-down condition for erection by said user. Broadly transversely partitioned cartons are old in the form as frequently used as egg cartons and the like. The present invention contemplates a transversely partitioned carton or box in which the side walls are hollow or of spaced apart construction as disclosed in applicant's Patent No. 2,493,189. By this construction the box or carton is provided with compartments or cells for the reception of goods, articles or the like.

This application is a division of applicant's pending application, Serial No. 89,891, filed April 27, 1949 which matured as Patent No. 2,688,432, granted Sept. 7, 1954.

It is, therefore, the principal object of the present invention to provide a simple yet effective means for erecting partitioned cartons or boxes that can be used by relatively inexperienced help.

Another object of this invention is the provision of means for accomplishing the foregoing object that results in an improved method of erecting knocked-down cartons having upstanding partitions upon erection of the knocked-down blank.

A still further object of the present invention is the provision of a device for accomplishing the foregoing objects that is composed of a minimum number of parts and of simple construction whose operation is obvious from a cursory examination thereof in view of the knocked-down blank to be erected thereby.

A still further and specific object of the present invention is the provision of an erecting device for erecting the side walls of knocked-down cartons and in which cartons the side walls are hingedly connected to the carton bottom.

A still further object of this invention is the provision of a partitioned box or carton produced in a knocked-down condition that can be readily erected with simple erecting means resulting in an improved method of erecting partitioned boxes or cartons.

Other objects and advantages of the present invention should be readily apparent by reference to the following specification considered in conjunction with the accompanying drawings forming a part thereof and it to be understood that any modifications may be made in the exact structural details there shown and described, within the scope of the appended claims, without departing from or exceeding the spirit of the invention.

In the drawings:

Fig. 1 is a plan view of a partly folded blank for providing a carton forming the subject matter of this invention.

Fig. 2 is a transverse sectional view through a folded blank of Fig. 1 showing the blank in the condition in which it is shipped to the user.

Fig. 3 is a perspective view of a partially erected carton from the blank of Fig. 1.

Fig. 7 is a perspective view of the blank of Figs. 1 and 2 in the first stage of erection.

Fig. 8 is a perspective view of a simple machine or device for erecting the carton of Fig. 3 showing the partially erected blank of Fig. 7 superimposed thereon.

Fig. 9 is a transverse sectional view through the erecting machine or device of Fig. 8 in its erecting position and illustrating the blank of Fig. 7 in its second stage of erection toward the erected carton of Fig. 3, said Fig. 9 being taken approximately on line 9—9 on said Fig. 8.

Fig. 14 is a partially folded plan view of a blank showing further modifications over the blank of Fig. 1.

Fig. 15 is a perspective view of a partially erected carton from the blank of Fig. 14.

Fig. 16 is a fragmentary sectional view through one end of the erected carton of Fig. 15 as seen from line 16—16 on said Fig. 15.

Throughout the several views of the drawings similar reference characters are employed to denote the same or similar parts.

Figure 4:
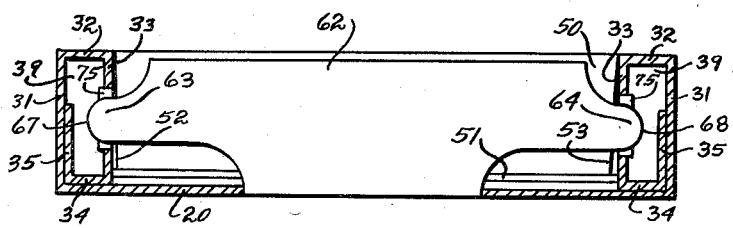
Fig. 4 is an enlarged transverse sectional view through a completely erected carton as seen from line 4—4 on Fig. 3.
Figure 5:
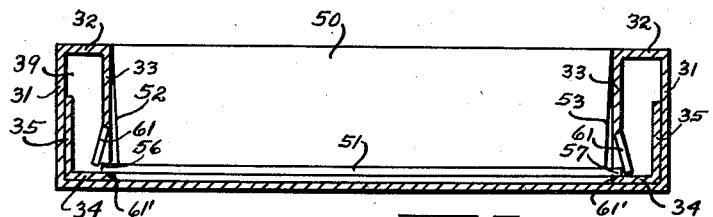
Fig. 5 is a transverse sectional view through a completely erected carton as seen adjacent either end thereof, for example, on line 5—5 on Fig. 3.

The several modifications of the present invention illustrated in the drawings will be described in succession basing said description on the form illustrated in Figs. 1 to 6, inclusive, with only so much of the other modifications being described in detail as they differ or are distinguishable from the modifications of said Figs. 1 to 6.

The blank of Fig. 1 comprises a main panel 20 having its edges defined by score or fold lines 21, 22, 23 and 24 of which the edges 22 and 24 will hereinafter be referred to as the sides while the edges 21 and 23 will be referred to as the ends; it being understood that this nomenclature is intended solely for convenience in description as the longer boundaries of a box or carton are usually referred to as the sides thereof while the remaining boundaries as the ends. Integrally, hingedly connected with the panel 20 through the side scores 22 and 24 are similar extensions 25 and 26 which are substantially identical and wherefore it is deemed sufficient if but one of them be described in detail.

Accordingly, extension 26 is provided with a plurality of score or fold lines 27, 28, 29 and 30 thereby providing, in said extension, between the score or fold line 24 and the end of said extension panels 31, 32, 33, 34 and 35.

In the erected carton, in each side wall, the panel 31 forms an outer wall member and is of a length substantially equal to the length of the main panel 20 having its ends defined by score or fold lines 36 and 37. The score or fold lines 36 and 37 respectively, integrally, hingedly connect with the panel 31 tucking flaps 38 and 39. The panel 32 forms a top wall member while the panel 33 forms the side wall inner wall member. The side wall inner wall member is of a length substantially equal to that of the outer wall member or panel 31 and has its ends defined by score or fold lines 40 and 41 which respectively, hingedly connect with the panel 33 tucking flaps 42 and 43. The panel 34 forms, in the erected carton side wall, a bottom wall member while the panel 35 forms a glue flap for a purpose presently to be made clear and for which reason it may carry adhesive 44.

The main or bottom panel 20 has integrally, hingedly connected therewith through its end scores 21 and 23 similar extensions 45 and 46 which form the carton end walls, and since they are substantially identical it is deemed sufficient if but one of them be described in detail. Accordingly, extension 46 is provided with score or fold lines 47 and 48 thereby providing in said extension between the score or fold line 23 and the end of the extension panels 49, 50 and 51. In the erected carton the panel 49, in each extension, forms an outer wall member and is of a length equal to the distance across the side walls outer wall members when in their erected positions. The panel 50 forms the end wall inner wall member and is of a length to fit between the erected carton side walls inner wall members having the edges thereof slightly converging as illustrated at 52 and 53. The flap 51 forms a locking flap for locking the side and end walls in erected positions and is located adjacent the bottom panel in the erected carton. The sides of the locking panel 51 diverge, as illustrated at 54 and 55, thereby providing the outer corners 56 and 57 of the panel 51 with a distance between them slightly greater than the distance between the erected side walls inner wall members for a purpose that will presently be made clear.

In order to provide a side wall lock to co-operate with the end wall locking corners 56 and 57 the said side walls inner wall members or panels 33 are provided inwardly of their ends 40 and 41 with slits 58 and 59 with the said side walls inner wall members or panels each provided, outwardly parallel with the score or fold line 29, from the slits 58 and 59 therein, with longitudinal slits 58' and 59' thereby, in effect, providing flaps 60 and 61, respectively located between the slit 58 and panel end score 40 and the slit 59 and panel end score 41. Since the slits 58' and 59' are located slightly inwardly of the score or fold line 29 there results a tongue 60' beneath the flaps 60 and a tongue 61' beneath the flap 61 on which the end wall locking flap corners 56 and 57 rest while effecting the locking of the walls in erected positions.

The carton bottom or main panel 20 is provided with one or more flaps 62, the number of said flaps depending upon the number of partitions to be supplied to the carton and therefore depending upon the number of compartments or cells to be arranged transversely of said carton. The drawings illustrate the several modifications of the invention as having three partitions to provide four compartments within the box or carton, but it is readily understood that a single partition, or a greater number than three partitions may be desirable, the construction of each partition will be substantially identical with the others, the sole distinction being the relative spacing of the flaps, partitions, with respect to one another.

As illustrated in the drawings the flap 63 is provided with reduced projections 63 and 64 located intermediate one longitudinal edge of the flap which is a cut line indicated in the drawings by the reference numeral 65 and the score or fold line 66, which hingedly connects the flap 62 to the carton bottom or main panel 20. The said flap 62 may take any suitable or desirable contour, in plan, that illustrated disclosing the reduced ends, 63 and 64 as rounded thereby resulting in the said projections having blunt but relatively narrow ends 67 and 68. The distance between said projection ends 67 and 68 is greater than the distance between the carton side walls inner wall members when in their erected positions and when said side walls are substantially vertically of the carton base or bottom 20.

In order to co-operate and lock the partition or partitions 62 in their erected positions the side walls inner wall members or panels 30 are each provided with the number of slits corresponding to the number of flaps in the carton bottom. Each of said slits is substantially identical and is in the form of an I including a vertical slit 69 with a transverse slit 70 and 71 respectively at the ends of the vertical slit 69. The outer ends of the slits 70 and 71 are, respectively, connected by a score or fold line 72 and 73 thereby providing between the vertical slit 69 and the score or fold lines 72 and 73, respectively, a flap 74 or 75.

After the blank has been cut and scored as just described and illustrated in Fig. 1 adhesive 44 is applied to the panel 39 as illustrated in Fig. 1, or the said adhesive may be applied to the side walls outer wall members or panels 31 for a distance outwardly of the score or fold lines 22 and 24 not exceeding the width of the glue flap 35. The side walls extensions 25 and 26 are then folded on their score or fold lines 29 whereupon the said extensions are folded on their score or fold lines 27 thereby bringing the glue flap 35 into face contact with the panel 31 with the adhesive 44 therebetween. The blank is now in the folded position of Fig. 2 and it is in this condition that the blank is shipped to the user for erection by him.

The user in desiring to set up or erect the carton from its knocked-down position of Fig. 2 first raises the side walls to the positions shown in phantom lines in Fig. 2 and indicated by reference numerals 76 and 77. The blank is then in the position of Fig. 7 thereby releasing the reduced portions or projections 63 and 64 from beneath the collapsed side walls, which is their normal position when shipped to the user. The blank while in the position of Fig. 7 is then placed on the erecting machine or device of Fig. 8 for positioning the flaps 62 so as to form the partitions of the box or carton.

The erecting machine or device of Fig. 8 comprises a bed plate 78 to the opposed edges of which are hingedly connected wings 79 and 80. Any suitable or desirable means may be employed for hingedly connecting the wings and bed plate, that shown in the drawings comprising forming each of the wings with spaced hinge lugs 81 alternating with similar hinge lugs 82 on the adjacent edge of the bed plate and with the hinge lugs in alignment to receive a hinge pin 83.

The bed plate 78 is provided with upstanding abutments or punches 84, there being as many said abutments as there are partitions or flaps 62. The abutments are shown in the drawings in pairs the purpose of which will be later made apparent with said abutments including an upright portion 85 and an anchoring portion 86. The forward face 87 of the abutment is to be normal or perpendicular to the body 78 or at least must have a portion thereof so related to the bed plate or body 78 which forms the final positioning gauge for the flaps for thereby insuring the partitions being vertical or normal to the bed plate 78 and to the carton base or main panel 20. As illustrated in the drawings the erecting device or machine is shown as formed of metal thereby having the abutments 84 conveniently formed as a stamping from the bed plate itself requiring a substantially triangular shaped piece cut from the bed plate and resulting in an aperture 88 in said bed plate which in no wise interferes with the operation of the erecting device or machine.

As illustrated in Fig. 8 upon having the carton in its partially erected condition of Fig. 7 properly placed on the machine the several abutments or punches 84 upwardly dispose or position the several flaps 62 allowing the said punches and their anchoring means 86 to project through the openings 89 resulting from the flaps 62.

The positioning of the flaps 62 as illustrated in Fig. 8 disposes the reduced ends or projections 63 and 64 in alignment with the cuts or slits 69 in the side walls inner wall members. At this time the wings 79 and 80 are actuated about their hinge pins 83 thereby bringing the carton or box side walls into their upright position and the wings 79 and 80 in the act of positioning said side walls force the flaps or partition ends into the cuts or slits 69, as clearly illustrated in Fig. 9.

Figure 6:
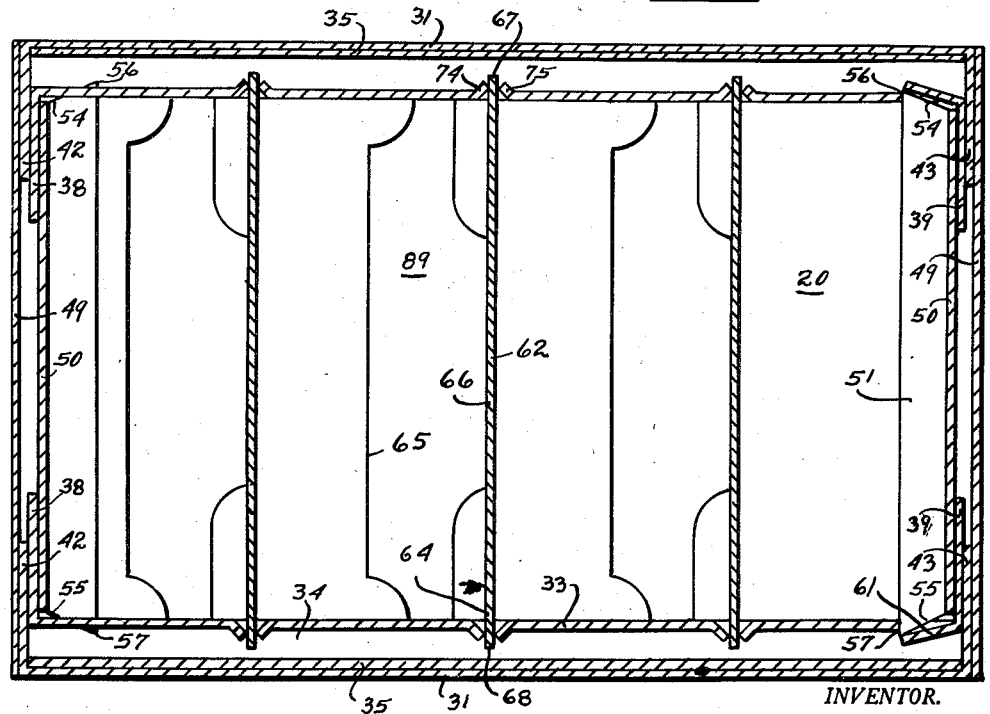
Fig. 6 is an enlarged horizontal sectional view through a completely erected carton as seen from line 6—6 on Fig. 3.

The insertion of the flaps or partitions projections 63 and 64 into the slits 69 inwardly swing the flaps 74 and 75 to the positions illustrated in Fig. 6. The normal tendency of said flaps 74 and 75 to return to their normal position of parallelism with the side walls inner wall members results in the said flaps 74 and 75 acting as wedge locks against the side walls returning to their normal flat position. The box or carton in this second step of its erection may therefore be removed from the machine or device of Fig. 8 while having the end walls folded to their operative positions, or the said end walls may be folded to their proper position while the semi-erected carton remains on the machine of Fig. 8.

In order to complete the erection of the carton the tucking flaps 38—42 and 39—43 are folded transversely of the main panel or carton bottom 20 whereupon the end wall extensions are successively folded on their score or fold lines to dispose the inner and outer end wall members or panels 49 and 50 vertically of the bottom with the aforementioned tucking flaps therebetween. The creeper or locking flap 51 is arranged to be parallel with the said carton main panel or bottom 20 and project inwardly of the carton. As was noted above the outer corners of this locking flap 51 are of slighter greater distance than the space between the side wall inner wall members and therefore upon reaching its lowermost position inwardly swings the flaps 60 and 61 so that the said free or locking corners 56 and 57 thereof engage behind the abutments formed by the side wall locking slits 58 and 59 and come to rest on the tongues 60' and 61', as clearly illustrated in Fig. 6 at the right-hand end thereof. The carton is now in its final erected position as illustrated in Fig. 3 if the two end walls were erected as the right-hand end wall is illustrated.

It will be noted that by this construction the carton or box is provided with transverse partitions formed from the bottom panel in such a way that a substantial portion of the bottom panel remains for each compartment and which portion is that part between the adjacent score or fold line 66 of one partition 62 and the cut line 65 of the other or next adjacent partition or flap 62. This provides a one piece carton or box transversely partitioned with a substantial bottom for each compartment.

Figure 10:
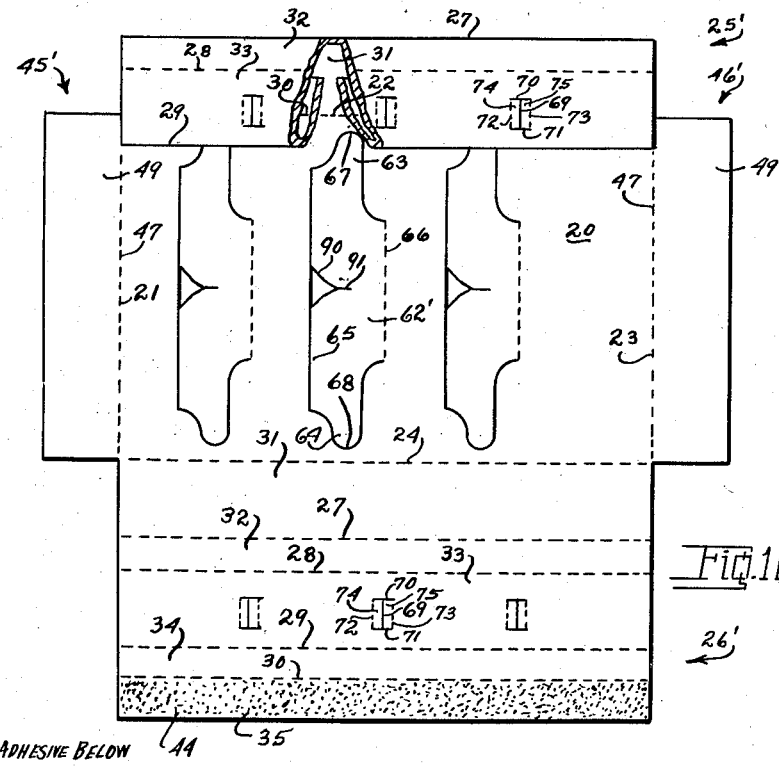
Fig. 10 is a plan view of a partly folded blank showing certain modifications over the blank of Fig. 1.
Figures 11, 13:
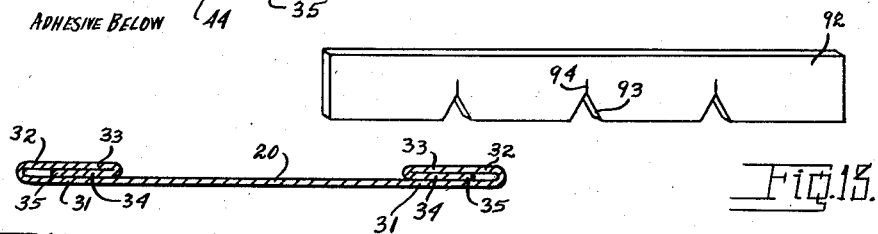
Fig. 11 is a transverse sectional view of a folded blank of Fig. 10 showing said blank in the condition for shipment to a user.
Fig. 13 is a perspective view of a strip which may be employed with the transversely partitioned box or carton for effecting a longitudinal partitioning of the box or carton.
Figure 12:
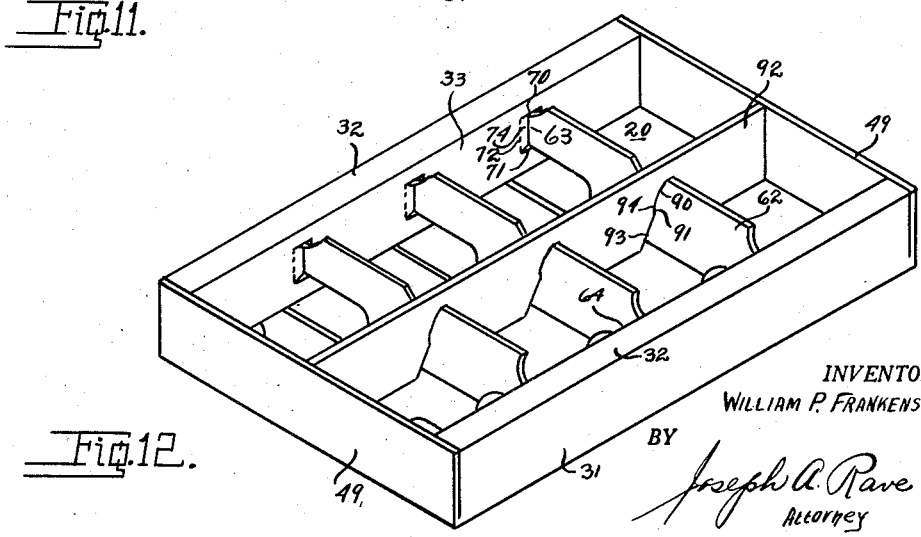
Fig. 12 is a perspective view of an erected carton from the blank of Figs. 10 and 11 and further illustrating a longitudinal partition.

In the modification of the carton illustrated in Figs. 10, 11 and 12, the chief distinction is in providing the end wall extensions 45' and 46' with but a single panel 49 which has its outer edge as a cut line instead of the score or fold line 47. This box or carton would be employed where the package, the partitioned carton with the goods in the several compartments, is to be enclosed in a wrapping whether of the transparent or opaque type, in other words, where the carton is not to have the walls interlocked with one another to retain them in an upright position. With this type of carton no tucking flaps are needed or desirable wherefore the blank of Fig. 10 is further modified over Fig. 1 to the extent of having removed from the side walls panels 31 and 33 the tucking flaps 38, 39, 42 and 43 as well as eliminating from the panels 33 the slits 58 and 59 and flaps 60 and 61.

The blank of Fig. 10 illustrates a further modification which could be incorporated with the blank of Fig. 1 whereby the box or carton may be partitioned longitudinally as well as transversely. This modification consists in providing in each flap 62' a notch 90 which is illustrated as funnel shaped and terminates in a slit 91 extending from the notch into the body of the partition or flap 62'.

With the notched flaps 62' is to be used a longitudinal partition as illustrated in Fig. 13. This partition, identified by the reference numeral 92, is merely a strip of card or paper board material for a length equal to that between end wall inner wall members and a height not exceeding that of the partition and is provided with as many notches 93 as the box or carton has transverse partitions. The member 92 has it notches 93 funnel shaped each terminating in a slit 94 at the base of the notch. It is believed the operation of the longitudinal partition strip 92 is obvious from Fig. 12 which shows the transverse and longitudinal partitions interlocked through their respective slits 91 and 94 with the notches 90 and 93 thereof affording a convenient means for interengaging the parts.

It is for the purpose of accommodating the longitudinal partition strip 92 that the carton or box assembling device or machine has the projections or posts 84 formed as pairs thereby providing, substantially, centrally of the said assembling machine or device a clear space for the longitudinal partition 92 and said partition 92 may be mounted in position while the carton or box is in the position illustrated in Fig. 8.

In the box or carton modifications as illustrated in Figs. 1 and 10, the end walls are either double thickness and locked in operative position through co-operating locking means integral therewith or of single thickness and retained in operative position by an exterior or external means, while in the modification illustrated in Figs. 14, 15 and 16 the said end walls are of hollow or spaced apart construction. In order to accomplish this the said end wall extensions 45" and 46" are each modified to the extent of providing an additional panel 95 therein, which in the erected carton, forms the end walls top wall members. In order to accomplish this the score or fold line 47 connects the said end walls outer wall members or panels 49 with the panels or end walls top wall members 95 thereby necessitating additional scores or fold lines 96 for connecting the end walls inner wall members or panels 50 with the top wall members or panels 95. In this modification the outermost panel 51" of each of the extensions 45" and 46" becomes a spacer flap and is adapted to be disposed on the carton or box main panel or bottom 20 but to be between the inner and outer wall members and space the same from one another.

The blank of Fig. 14 has its end walls extensions further modified to the extent of providing at the ends of the inner wall members or panels 50 spacer flaps 97 and 98 which are respectively, integrally, hingedly connected with said inner wall members or panels through score or fold lines 99 and 100. In this modification a modified form of erected wall lock is provided which includes locking lugs carried by the end walls inner wall members or panels 50, said locking lugs are indicated in the drawings by the reference numerals 101 and 102 and are located outwardly of the spacer flaps 97 and 98.

In order to co-operate with the locking lugs 101 and 102 the side walls inner wall members or flaps 33" are slightly modified to the extent of being provided with slots 103 and 104 which are respectively inwardly spaced from the end scores or fold lines 40 and 41 a distance equal to the end walls top wall members or panels 95 for thereby receiving the locking lugs 101 and 102 and locking the said end walls inner wall members in a position to be normal or vertical to the carton main or bottom panel 20 and parallel with the end walls outer wall members.

The blank of Fig. 14 is glued and shipped to the user in the same condition as the blanks of Figs. 1 and 10 and the user in erecting the said blank goes through substantially the identical steps above described in erecting the carton of Fig. 3 in that the side walls are first raised to their tubular position of Fig. 7 whereupon the blank is placed on the partition raising device or machine of Fig. 8 after which the side walls are brought to their final upright position, Fig. 9. The end walls of the said blank of Fig. 14 are then folded by folding each of the panels of said end wall extensions to be normal to one another which results in the said end walls being folded to the position illustrated in Fig. 16 and in which position the walls are locked by the interengagement of the end walls locking lugs 101 and 102 with the side walls co-operating locking slots 103 and 104. In the event the carton or box is to have the longitudinal partition, in addition to the transverse partitions, it is now placed in position in the same manner as above described with respect to the erection of the carton illustrated in Fig. 12.

From the foregoing, it is believed evident that there has been provided a box or carton which fulfills the objects initially set forth of providing an economical and simple knocked-down box or carton formed from a single blank to have transverse partitions and which box or carton has the desired rigidity and strength to accomplish its purpose.

What is claimed is:

1. The method of erecting a knocked-down carton into a carton having side and end walls with a transverse partition between said side walls comprising forming the knocked-down carton to have a bottom panel with extensions from two opposed sides thereof folded and secured to one another to provide side walls each of an articulated outer wall member, top wall member, inner wall member, and bottom wall member, said blank being formed to include extensions from the remaining edges of the bottom panel erectable to form end walls, and said blank including within the confines of the carton bottom panel an integral, hingedly connected transverse partition forming flap, erecting the side walls to form tubular extensions outwardly of the bottom panel, placing the blank on a device which automatically upwardly positions the partition flap, said device including wings hingedly mounted thereon, and actuating said wings on their hinges for bringing the side walls inner wall members into position with respect to the transverse partition, and finally erecting the end walls extensions to form a complete carton.

2. The method of erecting a knocked-down carton into a carton having side and end walls with a transverse partition between said side walls comprising forming the knocked-down carton to have a bottom panel with extensions from two opposed sides thereof folded and secured to one another to provide side walls each of an articulated outer wall member, top wall member, inner wall member, and bottom wall member, said side walls inner wall members each having formed therein a slit, said blank being formed to include extensions from the remaining edges of the bottom panel erectable to form end walls, and said blank including within the confines of the carton bottom panel an integral, hingedly connected transverse partition forming flap, erecting the side walls to form tubular extensions outwardly of the bottom panel, placing the blank on a device which automatically upwardly positions the partition flap, said device including wings hingedly mounted thereon, and actuating said wings on their hinges for bringing the side walls inner wall members into position with respect to the transverse partition, and forcing the transverse partition ends into said side walls inner wall members slits, and finally erecting the end walls extensions to form a complete carton.

3. The method of erecting a knocked-down carton from a one-piece blank wherein the carton blank has a bottom panel with hollow side walls hingedly connected to two opposed edges of the bottom panel, end walls at the two remaining edges of the bottom panel, and a tranverse partition formed by a flap cut from the carton bottom panel and having one edge of the flap integrally, hingedly connected to said bottom panel, comprising the steps of placing the carton blank on an erecting device which automatically upwardly actuates the partition flap about its hinge connection for positioning it transversely of the bottom panel and which erecting device then swings the hollow side walls to their upstanding positions to operatively engage the transverse partition and hollow side walls.

4. The method of erecting a carton from a one-piece blank wherein the carton blank has a bottom panel with hollow side walls hingedly connected to two opposed edges of the bottom panel, end walls at the two remaining edges of the bottom panel, and a transverse partition formed by a flap cut from the bottom panel and having one edge of the flap integrally, hingedly connected to said bottom panel, said hollow side walls each having a slit therein in alignment with the transverse partition, comprising the steps of placing the carton blank on an erecting device which automatically upwardly actuates the partition flap about its hinge connection for positioning it transversely of the bottom panel and which erecting device then swings the hollow side walls to their upstanding positions to force the ends of the transverse partition into the side walls slits to operatively connect the transverse partition and hollow side walls.

5. An erecting device for erecting a carton which includes hollow side walls and a transverse partition integral with and upstanding from the carton bottom comprising a body member receiving the carton bottom, a punch upstanding from the body member for positioning the integral transverse partition flap to be angularly, upwardly of the carton bottom, and wings hingedly mounted on the body member underlying the carton hollow walls for swinging movement to an upstanding position to effect an operative engagement of said hollow walls with the transverse partition.

6. In an erecting device for erecting a carton having a bottom panel with hollow walls hingedly connected along two opposed edges of said bottom panel and said bottom panel having formed therein a flap with one edge integrally connected therewith to upstand transversely of the bottom panel as a partition, the combination of a body member of a width substantially equal to the distance between the hinge connection of the side walls to the bottom panel and adapted to receive the said bottom panel, a punch upstanding from the body member for disposing the bottom panel partition flap upwardly with respect thereto, and a wing hingedly connected to each of two opposite edges of the body member with said hinge connections adapted to underlie the hinge line connections of the side walls with the carton bottom so that actuation of the wings causes positioning of the hollow side walls to be normal to the body member and carton bottom panel and interconnects the said transverse partition flap and carton side walls.

7. In an erecting device for erecting a carton having a bottom panel with hollow walls hingedly connected along two opposed edges of said bottom panel and said bottom panel having formed therein a flap with one edge integrally connected therewith to upstand transversely of the bottom panel as a partition, the combination of a body member of a width substantially equal to the distance between the hinge connections of the side walls to the bottom panel and adapted to receive the said bottom panel, a punch upstanding from the body member for disposing the bottom panel partition flap upwardly with respect thereto, and a wing hingedly connected to each of two opposite edges of the body member with said hinge connections adapted to underlie the hinge line connections of the side walls with the carton bottom so that actuation of the wings causes positioning of the hollow side walls to be normal to the body member and carton bottom panel and interconnects the said transverse partition flap and carton side walls, said hinge connections of the wings and body member comprising spaced lugs along the edges of the body member downwardly turned to form hinge pin passageways, and said wings having outwardly projecting lugs similarly downwardly turned to form passageways for the hinge pins and with said wings lugs disposed in the spaces between adjacent body member hinge lugs, and hinge pins simultaneously in said body member and wings lugs passageways.

8. In an erecting device for erecting a carton having a bottom panel with hollow walls hingedly connected along two opposed edges of said bottom panel and said bottom panel having formed therein a plurality of flaps each having one edge integrally connected with said bottom panel to upstand transversely of the bottom panel as partitions, the combination of a body member of a width substantially equal to the distance between the hinge connections of the side walls to the bottom panel and adapted to receive the said bottom panel, a plurality of punches, one for each partition flap, upstanding from the body member for disposing the said bottom panel partition flaps upwardly with respect to said bottom panel and a wing hingedly connected to each of two opposite edges of the body member with said hinge connections adapted to underlie the hinge line connections of the side walls with the carton bottom so that actuation of the wings causes positioning of the hollow side walls to be normal to the body member and carton bottom panel and interconnects the said transverse partition flaps and carton side walls.

9. In an erecting device for erecting a carton having a bottom panel with hollow walls hingedly connected along two opposed edges of said bottom panel and said bottom panel having formed therein a plurality of flaps each having one edge integrally connected with said bottom panel to upstand transversely of the bottom panel as partitions, the combination of a body member of a width substantially equal to the distance between the hinge connections of the side walls to the bottom panel and adapted to receive the said bottom panel, a plurality of punches, one for each partition flap, upstanding from the body member for disposing the said bottom panel partition flaps upwardly with respect to said bottom panel, and a wing hingedly connected to each of two opposite edges of the body member with said hinge connections adapted to underlie the hinge line connections of the side walls with the carton bottom so that actuation of the wings causes positioning of the hollow side walls to be normal to the body member and carton bottom panel and interconnects the said transverse partition flaps and carton side walls, said hinge connections of the wings and body member comprising spaced lugs along the edges of the body member downwardly turned to form hinge pin passageways, and said wings having outwardly projecting lugs similarly downwardly turned to form passageways for the hinge pins and with said wings lugs disposed in the spaces between adjacent body member hinge lugs, and hinge pins simultaneously in said body member and wings lugs passageways.

References Cited in the file of this patent

UNITED STATES PATENTS

| | | |
|---|---|---|
| 2,337,803 | Deline | Dec. 28, 1943 |
| 2,458,341 | Cake | Jan. 4, 1949 |
| 2,737,861 | Watson | Mar. 13, 1956 |